(12) United States Patent
Chung et al.

(10) Patent No.: US 8,624,530 B2
(45) Date of Patent: Jan. 7, 2014

(54) SYSTEMS AND METHODS FOR TRANSMISSION OF ELECTRIC POWER TO DOWNHOLE EQUIPMENT

(75) Inventors: Cameron K. Chung, Edmonton (CA); Andrew K. Ball, Tulsa, OK (US); Matthew D. Wisnewski, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 185 days.

(21) Appl. No.: 13/160,004

(22) Filed: Jun. 14, 2011

(65) Prior Publication Data

US 2012/0319474 A1    Dec. 20, 2012

(51) Int. Cl.
*H02K 7/14* (2006.01)
*G05D 1/02* (2006.01)

(52) U.S. Cl.
USPC ............ 318/3; 318/800; 318/16; 318/432; 417/423.3; 166/250.15; 166/345; 340/854.9

(58) Field of Classification Search
USPC ......... 318/430, 432, 800, 803, 16; 417/423.3; 166/345, 250.15; 340/854.9
See application file for complete search history.

(56) References Cited

U.S. PATENT DOCUMENTS

| | | | | |
|---|---|---|---|---|
| 2,629,076 | A | | 5/1949 | Lloyd et al. |
| 3,402,391 | A | * | 9/1968 | Howard et al. ............ 340/3.9 |
| 3,437,992 | A | * | 4/1969 | Johnston ................ 340/854.5 |
| 3,513,379 | A | * | 5/1970 | Spann ..................... 323/291 |
| 4,658,383 | A | * | 4/1987 | Zimmer .................... 367/29 |
| 5,259,559 | A | * | 11/1993 | Fitzgerald ................ 239/728 |
| 5,621,844 | A | * | 4/1997 | Bridges ................... 392/301 |
| 5,782,608 | A | * | 7/1998 | McKee .................... 417/43 |
| 6,043,995 | A | * | 3/2000 | Leuthen .................... 363/37 |
| 6,150,601 | A | * | 11/2000 | Schnatzmeyer et al. ..... 136/201 |
| 6,420,976 | B1 | * | 7/2002 | Baggs et al. ............. 340/853.3 |
| 6,621,721 | B2 | * | 9/2003 | York ........................ 363/65 |
| 6,945,330 | B2 | * | 9/2005 | Wilson et al. ............. 166/373 |
| 7,009,312 | B2 | * | 3/2006 | Hernandez-Marti et al. ... 307/34 |
| 7,026,951 | B2 | * | 4/2006 | Bailey et al. ............. 340/854.3 |
| 7,152,680 | B2 | * | 12/2006 | Wilson et al. ............. 166/298 |
| 7,348,894 | B2 | * | 3/2008 | Bailey et al. ............. 340/854.3 |
| 7,615,893 | B2 | * | 11/2009 | Biester et al. .............. 307/82 |
| 7,649,474 | B1 | * | 1/2010 | Gard ..................... 340/854.6 |

(Continued)

FOREIGN PATENT DOCUMENTS

| | | |
|---|---|---|
| EP | 1082736 | 3/2001 |
| EP | 2194638 | 6/2010 |

(Continued)

*Primary Examiner* — Paul Ip
(74) *Attorney, Agent, or Firm* — Law Offices of Mark L. Berrier

(57) ABSTRACT

Systems and methods in which output power that would conventionally be provided by surface equipment to drive downhole equipment, is transformed to increase the voltage before transmitting the power over a power cable to downhole equipment. The downhole equipment includes a step-down transformer that receives power from the power cable at a voltage which is too high to drive the motor or other downhole equipment and reduces the voltage to a level that is suitable for use by the downhole equipment. The step-down transformer may utilize toroidal transformers that are positioned around other components of the system, such as the shaft that couples a motor to an electric submersible pump. The step-down transformer may be configured as a modular unit that can be inserted between components (e.g. motor and seal) that are manufactured using conventional designs.

12 Claims, 3 Drawing Sheets

(56) References Cited

U.S. PATENT DOCUMENTS

| | | | |
|---|---|---|---|
| 7,724,549 B2* | 5/2010 | Skibinski et al. | 363/39 |
| 7,798,215 B2* | 9/2010 | Leuthen et al. | 166/250.15 |
| 8,082,217 B2* | 12/2011 | Crossley et al. | 706/16 |
| 8,212,410 B2* | 7/2012 | Biester et al. | 307/82 |
| 8,264,369 B2* | 9/2012 | Hall et al. | 340/854.8 |
| 8,305,229 B1* | 11/2012 | Gard | 340/854.6 |
| 2003/0011490 A1* | 1/2003 | Bailey et al. | 340/853.3 |
| 2003/0102720 A1* | 6/2003 | Baggs et al. | 307/149 |
| 2005/0029476 A1* | 2/2005 | Biester et al. | 251/58 |
| 2005/0190584 A1* | 9/2005 | Hernandez-Marti et al. | 363/34 |
| 2005/0270172 A1* | 12/2005 | Bailey et al. | 340/854.3 |
| 2008/0074074 A1* | 3/2008 | Skibinski et al. | 318/800 |
| 2008/0306892 A1* | 12/2008 | Crossley et al. | 706/16 |
| 2009/0000789 A1* | 1/2009 | Leuthen et al. | 166/369 |
| 2009/0090555 A1* | 4/2009 | Boone et al. | 175/45 |
| 2009/0101338 A1* | 4/2009 | Flanders | 166/250.01 |
| 2009/0146603 A1* | 6/2009 | Sihler et al. | 318/812 |
| 2009/0151932 A1* | 6/2009 | Hall et al. | 166/244.1 |
| 2009/0200035 A1 | 8/2009 | Bjerkreim et al. | |
| 2009/0250210 A1* | 10/2009 | Allen et al. | 166/250.15 |
| 2010/0019573 A1* | 1/2010 | Biester et al. | 307/12 |
| 2010/0019930 A1* | 1/2010 | Biester et al. | 340/850 |
| 2010/0132934 A1* | 6/2010 | Storm et al. | 166/57 |
| 2011/0077885 A1* | 3/2011 | Zweigle et al. | 702/66 |
| 2011/0304207 A1* | 12/2011 | Sannino et al. | 307/38 |
| 2012/0027630 A1* | 2/2012 | Forsberg et al. | 417/423.3 |
| 2012/0140365 A1* | 6/2012 | Labuschagne | 361/47 |
| 2012/0152559 A1* | 6/2012 | Knox | 166/345 |
| 2012/0200279 A1* | 8/2012 | Pamulaparthy et al. | 323/301 |
| 2012/0205981 A1* | 8/2012 | Varma et al. | 307/64 |
| 2012/0212351 A1* | 8/2012 | Hu et al. | 340/854.9 |
| 2012/0223524 A1* | 9/2012 | Williams | 290/50 |
| 2012/0267896 A1* | 10/2012 | Cousineau et al. | 290/55 |
| 2012/0267955 A1* | 10/2012 | Zhan et al. | 307/31 |
| 2012/0292992 A1* | 11/2012 | Williams | 307/23 |
| 2012/0319628 A1* | 12/2012 | Rongve | 318/400.02 |
| 2013/0057412 A1* | 3/2013 | Gard | 340/854.9 |
| 2013/0073100 A1* | 3/2013 | Seeley | 700/290 |

FOREIGN PATENT DOCUMENTS

| | | |
|---|---|---|
| WO | WO-2006132541 | 12/2006 |
| WO | WO-2007055587 | 5/2007 |
| WO | WO-2007055593 | 5/2007 |

* cited by examiner

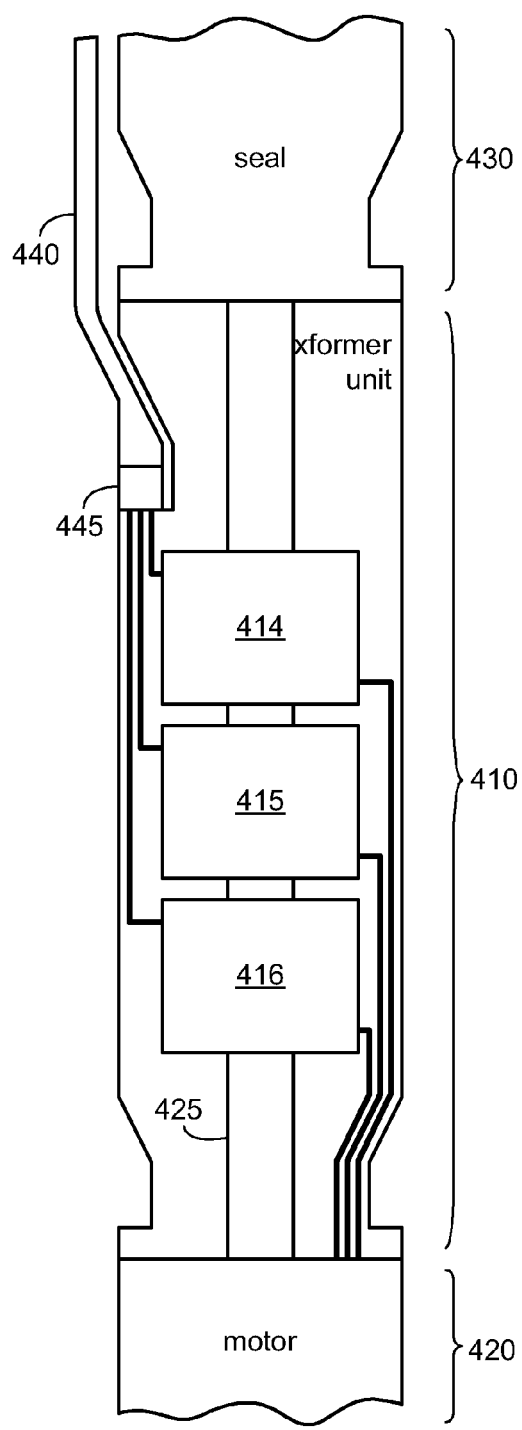
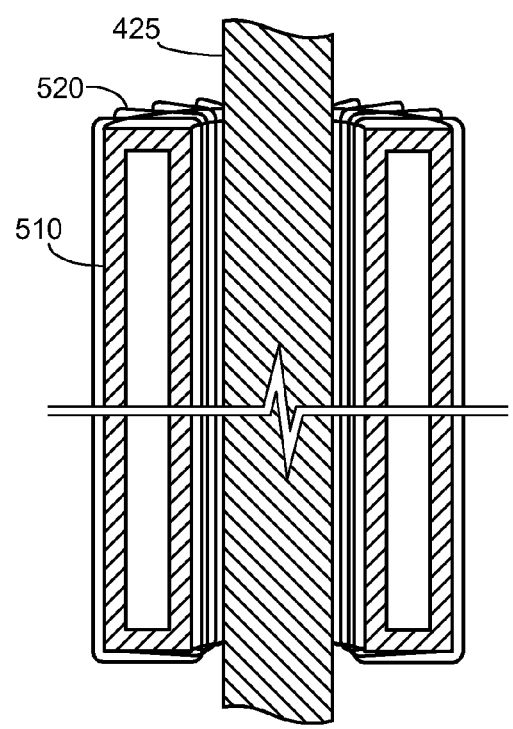
Fig. 4
Fig. 5

SYSTEMS AND METHODS FOR TRANSMISSION OF ELECTRIC POWER TO DOWNHOLE EQUIPMENT

BACKGROUND

1. Field of the Invention

The invention relates generally to oil production, and more particularly to systems and methods for transmission of power to downhole equipment such as electric submersible pump systems.

2. Related Art

Oil is typically extracted from geological formations through the wells that extend far below the earth's surface. These wells may be drilled on dry land, or they may be subsea wells. Often, the naturally existing pressure in the wells is insufficient to force the oil out of the wells. In this case, artificial lift systems such as electric submersible pumps (ESP's) are used to extract the oil from the wells. ESP's are also commonly utilized when operators want to increase the flow rate of the fluid being extracted, such as when the water cut (percentage of water versus oil) increases.

An ESP system includes a pump and a motor that are lowered into a producing region of the well. The pump is connected to a conduit through which oil is pumped to the surface. A power source at the surface of the well is connected to the ESP motor via a submersible power cable. Because the power cable must extend along the entire length of the well, the cable represents a significant portion of the system, both physically and in the cost of the system. As it is necessary to drill deeper and deeper wells to reach oil-bearing formations, the power cables of ESP systems used in these wells must be longer and longer. As a result, the power cable represents an increasing portion of the system cost, particularly in light of the increasing cost of copper, which is typically used to form the conductors of the cable.

There are also significant physical limitations associated with longer cables. For instance, increased length of power cables increases the amount of power loss in the cables. Additionally, there is a maximum amount of power which is deliverable at conventional voltages. This is because, with a limited amount of space available in the wellbore for power cable conductors, there is a maximum current that can be drawn before heating in the cable causes the maximum operating temperature of the cable to be exceeded. This maximum temperature is normally the temperature at which the cable's insulation begins to break down, potentially allowing arcing between conductors.

SUMMARY OF THE INVENTION

In order to reduce the cost of power cables for downhole electrical equipment, the present systems and methods utilize step-up and step-down transformers to increase the voltage at which electric power is transmitted through the power cable between the surface equipment and the downhole equipment. By increasing the voltage at which power is transmitted over the cable, less current is required for the transmission of an equivalent amount of power in conventional systems. This reduces the heat dissipation in the cable and allows the use of physically smaller conductors in the cables than comparable conventional systems. The reduced conductor size reduces the cost of the cable.

The embodiments of the invention described herein include systems and methods in which surface equipment generates output power which would conventionally be provided to drive the downhole equipment, and then uses a step-up transformer to increase the voltage of the output power (artificially) above the conventional voltage. The output power is then applied to the power cable at this increased voltage and is transmitted to the downhole equipment. The downhole equipment includes a submersible step-down transformer that receives the transmitted electric power from the power cable at a voltage which is too high to drive the motor or other downhole equipment. The step-down transformer reduces the voltage of the received power to a level that is suitable for use by the motor or other equipment and provides the reduced-voltage power to the equipment.

One embodiment comprises an ESP system that includes a pump, an electric motor, a shaft coupled to the pump and driven by the motor, and a step-down transformer subsystem. The step-down transformer subsystem is configured to receive power from a submersible power cable at one voltage and to transform the power to a second, lower voltage which is suitable for operating the motor. The transformer subsystem may be coupled between the motor and the seal, and may allow oil to flow therethrough between the motor and the seal. The step-down transformer subsystem may include one or more toroidal transformers, each of which has an axial aperture therethrough, and each of which is positioned so that the shaft extends through its axial aperture. The transformer subsystem is designed to operate efficiently at the high temperatures that are present in a downhole environment. The transformer subsystem may be configured to receive three-phase power and to separately step down each phase. In one embodiment, the transformer subsystem is a self-contained, modular unit that is designed to be coupled between components (e.g. the motor and seal) that are designed to be coupled directly to each other. The system may also include surface equipment that produces power at a first voltage and steps up the voltage to an increased level before transmitting it over a power cable to the step-down transformer subsystem located downhole with the ESP.

Another embodiment comprises a method for providing power to downhole equipment such as an ESP system. The method may include the steps of providing power at a surface location, transforming the power to step-up its voltage, transmitting the power over a power cable to equipment positioned downhole, stepping down the voltage so that it is at a level suitable for the downhole equipment, and providing the stepped-down power to the downhole equipment. In one embodiment, the voltage is stepped up from less than 8 kV at the surface to more than 8 kV on the power cable, and is then stepped back down to less than 8 kV before being provided to the downhole equipment. In one embodiment, the voltages are stepped up and down by a factor of at least 2. In one embodiment, the voltage transformation is performed by one or more toroidal transformers positioned with the downhole equipment.

Another embodiment comprises a method for retrofitting an electric submersible pump (ESP) system. In this embodiment, an ESP system includes a drive subsystem configured to generate output power at a first voltage, and a motor which is coupled to the drive subsystem by a power cable, where the motor is configured to receive power from the cable at a second voltage and to operate using the received power at the second voltage. A step-up transformer is inserted between the drive subsystem and the power cable, so that the step-up transformer transforms the output power from the first voltage higher voltage which is transmitted over the power cable. A step-down transformer is inserted between the power cable and the motor. The step-down transformer receives power from the power cable and steps the power back down to the second voltage, which is then provided to the motor. In one embodiment, the initial voltage and the voltage provided to the motor are less than 8 kV, while the voltage on the power cable is greater than 8 kV. The voltages may stepped up and down in one embodiment by a factor of at least 2. The voltage transformation may be performed, for example, by one or more toroidal transformers positioned with the downhole equipment.

Numerous other embodiments are also possible.

BRIEF DESCRIPTION OF THE DRAWINGS

Other objects and advantages of the invention may become apparent upon reading the following detailed description and upon reference to the accompanying drawings.

FIG. 4 is a diagram illustrating the configuration of an ESP in accordance with one embodiment.

FIG. 5 is a diagram illustrating the structure of an individual toroidal transformer.

Figure 1:
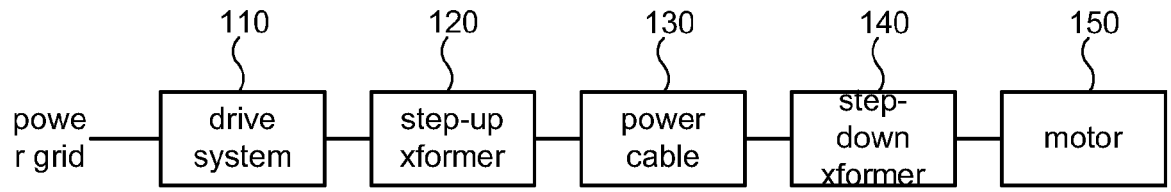
FIG. 1 is a functional block diagram illustrating the structure of an improved system for transmitting power to downhole equipment in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

Generally speaking, the present systems and methods are designed to increase the voltage of electrical power that is provided at the surface of a well over the levels at which power is conventionally provided. The increased-voltage power is transmitted over a submersible power cable from the surface equipment that generated the power to the downhole equipment that will use the power. The power received downhole is stepped down to a lower voltage before it is used by the downhole equipment. Because the power is transmitted over the power cable at a voltage which is higher than in a comparable conventional system, the same amount of power can be transmitted at a lower current, which can be carried by a smaller, less expensive cable than that of the conventional system.

Although the present systems and methods can be used with other types of downhole equipment, the following description will focus primarily on embodiments that are implemented in artificial lift systems that employ ESP's. The disclosure should therefore be broadly construed to include other types of downhole equipment as well.

Conventionally, when power is provided to downhole equipment, the power is generated by surface equipment at a first voltage and is then transmitted via a power cable to the downhole equipment. Because there is a voltage drop across the power cable, the voltage received by the downhole equipment is lower than the first voltage. Consequently, when the system is designed, the voltage needed by the downhole equipment is determined, the voltage drop across the power cable is determined (or estimated), and the surface equipment is designed to produce the sum of these voltages.

As downhole systems have evolved, systems have been developed that require increasing amounts of power. Conventionally, as more power has been required, power cables have been redesigned with larger conductors to carry the power. This response to increasing power requirements, however, is limited by several factors. One such factor is space in the wellbore. This space, which must be shared by both the power cable and the production tubing, is limited, so there is a physical limit on the size of conductors that can be used. Another limiting factor is the temperature in which the power cable must operate. Cable insulation such as EPM rubber cannot be used above 500° F., so the current through the cable (which generates heat that must be dissipated by the cable and surrounding geological formation) is limited.

Conventionally, the alternative to increasing cable size or current has been to increase the operating voltage of the downhole motor to which the power is being supplied. This operating voltage, however, is limited. Since these motors must be designed to fit within the borehole, there is only room in the motor for a limited amount of electrical insulation. As a result, increasing the voltage at which the motor operates increases the risk of arcing between the magnet wires, breakdown of the insulation and failure of the motor. The present systems and methods avoid the need to redesign conventional motors to handle higher voltages by stepping down the increased voltage of the power cable.

Referring to FIG. 1, a functional block diagram illustrating the structure of an improved system for transmitting power to downhole equipment in accordance with one embodiment is shown. In this embodiment, the system includes: a drive system 110, a step-up transformer 120, a submersible power cable 130, a step-down transformer 140 and downhole electric equipment 150.

Drive system 110 generates a surface voltage in the same manner as in a conventional ESP system. In fact, drive system 110 may itself be of conventional design. The drive output voltage is stepped up to an increased voltage level by step-up transformer 120. Because this increased voltage is applied to the surface end of power cable 130, it may be referred to herein as the surface voltage. The surface voltage is carried by power cable 130 to step-down transformer 140. The voltage at the downhole end of the power cable may be referred to herein as the terminal voltage. Although the terminal voltage has dropped from the surface voltage due to the impedance of the cable, it must still be reduced to a level that can be used by the motor. Transformer 140 therefore steps down the terminal voltage to an operating voltage which is suitable to drive the motor.

Figure 2:
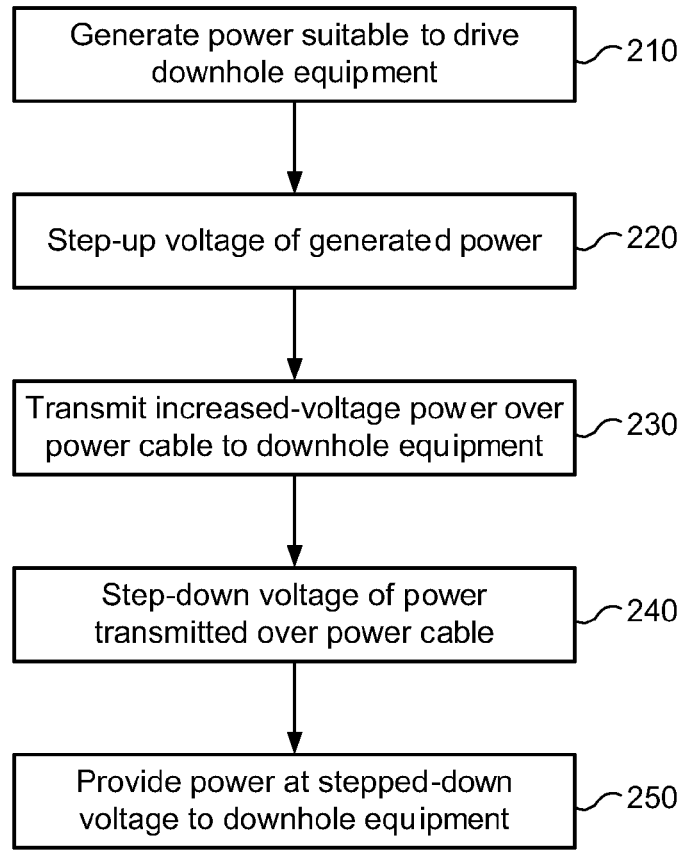
FIG. 2 is a flow diagram illustrating a method that corresponds to the generalized system of FIG. 1.

FIG. 2 is a flow diagram illustrating a method that corresponds to the generalized system of FIG. 1. The method of FIG. 2 begins with the generation of output power to drive the downhole equipment (210). The voltage of the generated power may be slightly higher than the voltage required by the downhole equipment to account for the voltage drop across the cable. For instance, if the downhole equipment requires 4 kV, the output power may be produced at 4.5 kV. The output power is then transformed (stepped up) at 220 to a substantially higher voltage (e.g., from 4.5 kV to 13.5 kV). The higher-voltage power is then transmitted over the power cable (230). The step-down transformer at the terminal end of the cable transforms the output power at 240 to a voltage that is suitable for the downhole equipment (e.g., 4 kV), and provides the transformed power to the downhole equipment to drive the equipment (250). Thus, the present systems may be characterized as receiving power at a medium voltage (approximately 2 kV-8 kV), transforming the power to a high voltage (>8 kV) for transmission over the power cable, and transforming the power back to a medium voltage for use by the downhole equipment.

Figure 3:
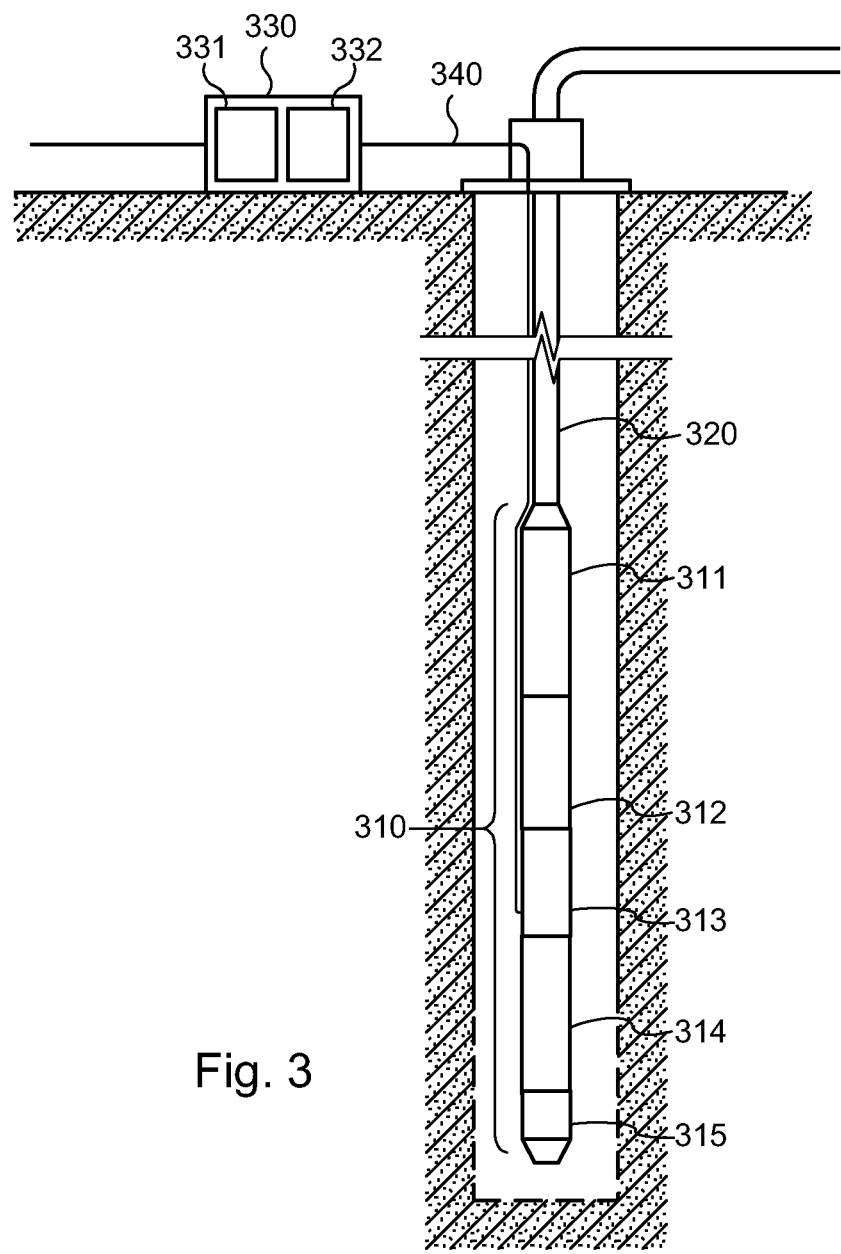
FIG. 3 is a diagram illustrating an exemplary ESP system in which an embodiment of the present invention is implemented.

FIG. 3 is a diagram illustrating an exemplary ESP system in which an embodiment of the present invention is implemented. In this system, ESP system 310 is coupled to a tubing string or other conduit 320. ESP system 310 is positioned in a production section of the well bore. ESP system 310 includes a pump 311, a seal 312, step-down transformer 313, an electric motor 314, and a gauge package 315. Equipment 330 at the surface of the well ("surface equipment") includes a drive portion 331 and a step-up transformer 332. The output voltage produced by surface equipment 330 is transmitted downhole via power cable 340.

In order to minimize the cost of implementing the higher-voltage transmission of power to the downhole equipment, drive portion 331 of the surface equipment may utilize a conventional design. For example, drive portion 331 may generate output power at a voltage of 4000V (as might conventionally be used to drive a 3500V motor). Step-up transformer 332 can then increase the voltage to, for example, 12,000V for transmission over power cable 340.

The amount of power delivered to the downhole equipment is a function of the voltage and current:

$$P=V*I$$

where P is power, V is voltage and I is current. Consequently, if the surface voltage is increased by a factor of 3, the current can be reduced by a factor of 3, while delivering the same amount of power to the cable. Since the current is reduced, the amount of power actually dissipated by the cable is reduced, as shown by the equation $$P=I^2*R$$

where P is power, I is current and R is resistance.

There are several ways to take advantage of the reduced current in the power cable. For example, in comparison to the power cable in a conventional system, the reduced current in the cable leads to reduced power dissipation in the cable, which results in greater efficiency—more power transmitted to the downhole equipment. Alternatively, the size of the conductors in the cable can be reduced from that of a conventional cable. This will increase the resistance and resulting power dissipation of the cable but, in comparison to a conventional system with the same cable power dissipation, the smaller conductors will result in a reduced cost for the cable. In another alternative configuration, the cable can use the same size conductors as in a conventional system, but the cable can be lengthened. This configuration also increases the total resistance and resulting power dissipation of the cable, but allows power to be provided to equipment that is sufficiently deep in the well as to be outside the range of conventional systems.

Referring to FIG. 4, a diagram illustrating the configuration of an ESP in accordance with one embodiment is shown. Only the portion of the ESP that includes the modular step-down transformer unit is depicted in the figure. The modular design allows the transformer unit to be coupled to existing motors, reducing design costs and facilitating retrofitting of existing systems.

FIG. 4 shows a modular step-down transformer unit 410 which is coupled between the motor 420 and the seal 430 of the ESP. In this embodiment, a high-voltage power cable 440 carries power downhole to the ESP. The terminal end of power cable 440 is connected to transformer unit 410 using conventional coupling 445. The electrical conductors of cable 440 are electrically coupled to the step-up transformer within the housing of the transformer unit in the same manner in which the conductors are coupled to the motor lead extensions in a conventional ESP. Transformer unit 410 likewise uses conventional connections to couple the secondary windings of the transformer unit to the leads of the motor. The use of conventional connections may allow the use of prefabricated motor lead extensions and potheads with tri-lead connectors already attached, thereby eliminating cable/lead extension splices in the field. It may also allow the use of shorter motor lead extensions.

The transformer unit is, like the motor and seal, filled and insulated with motor oil. As a result, the transformer can accommodate fluid exchange between itself, the motor and the seal. Alternatively, if it is desired or necessary to isolate the transformer unit from this fluid exchange, diversion channels may be provided through the unit to allow oil to flow between the motor and the seal.

In this embodiment, the power supplied to the ESP is three-phase power. Transformer unit 410 includes three different individual transformers (414-416) to step-down the three phases supplied by the power cable. For each phase, the corresponding conductor of the power cable is connected to a primary winding of one of the individual transformers. The secondary winding of the individual transformer is connected to a lead of the motor 420, which is in turn connected to one of the stator windings in the motor. The high-voltage, lower-current AC signal on the primary winding induces a lower-voltage, higher-current AC signal on the secondary winding. Thus, transformer unit 410 steps down the high voltage power from the cable to a lower voltage that is suitable to drive motor 420.

As depicted in FIG. 4, individual transformers 414-416 within transformer unit 410 are positioned in the middle of the unit. More specifically, individual transformers 414-416 are coaxial with the shaft 425 of motor 420. Individual transformers 414-416 are toroidal transformers. Each individual transformer forms a toroid which is generally cylindrical with a cylindrical hole through its center. This structure is shown in more detail in FIG. 5.

Referring to FIG. 5, the structure of one of the individual transformers is shown. The transformer has a hollow toroidal core 510. The insulated wire (e.g. 520) of the primary and secondary windings is wrapped around toroidal core 510 to form the transformer. The hole (axial aperture) through the center of the toroidal shape is sufficiently large to allow the shaft 425 of the motor to pass through it. This configuration makes efficient use of the available annular available space. While the inner and outer diameters of the toroidal shape are in large part determined by the size of the other components (e.g., ESP outer diameter, shaft diameter), the length of the transformer can be easily varied to meet the needs of the system. It should also be noted that, if the desired/necessary length of the transformer exceeds the length that can be accommodated by conventional shipping methods (e.g., the 48-foot maximum length of a semi trailer), multiple serially arranged individual transformers can be coupled together to perform in the same manner as a longer transformer.

Toroidal transformers have not conventionally been used as power transformers. Toroidal transformers are conventionally used in higher frequency and lower temperature environments, and usually have high winding costs. Previously, toroidal transformers have been used to transform no more than about 10 kVA. In the present systems and methods, the transformers are used to transform 100's of kVA. The pressure that is present in the downhole environment, however, prevents degradation that would otherwise result from voltage stresses in a surface environment, so the toroidal design can be used to step down the voltage for the downhole equipment.

Because the temperature in a downhole environment is typically much higher than in a surface environment, the transformers should be able to function efficiently at these high temperatures. Downhole temperatures may range from as low as 160° F. to as high as 450° F. or even 500° F. Conventional transformers designed for surface applications (e.g. conventional utility transformers) use materials that may become so inefficient at these higher temperatures that the transformers cannot provide the required amount of power. In one embodiment, the transformer core is made of a material that has a Curie temperature (the temperature above which the material is substantially de-magnetized) and a magnetization saturation point of at least 500° F. to maintain the efficiency of the transformer at downhole temperatures. Although, theoretically, any material having a Curie temperature above the operating temperature will work, but by selecting materials that have high magnetization performance at or near the operating temperature, it is possible to reduce the size (length) of the core.

It should be noted that the positioning of the transformer unit between the motor and the seal as shown in FIGS. 4 and 5 is not required, and may be different in alternative embodiments. For instance, because the transformers have no moving parts, they tend to be very efficient and dissipate very little heat, so they can be placed in positions where they are not cooled by oil, such as between the pump intake or the gas separator and the seal.

As noted above, the embodiments described in detail above are exemplary, and alternative embodiments of the invention may vary from those above in various ways. For example, the step-down transformer unit may be located at various positions within the ESP system, the specific voltages at which the system operates may vary, and so on. Further, the steps of the methods discussed above need not be performed in the specific order described herein. It should therefore be understood that the foregoing embodiments are illustrative and that the scope of the invention is not limited to these embodiments. Many additional variations, modifications, additions and improvements to the embodiments described above are possible. It is contemplated that these variations, modifications, additions and improvements fall within the scope of the invention as detailed within the following claims.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

What is claimed is:

1. A system comprising:
an electric submersible pump apparatus having
a pump,
an electric motor,
a shaft coupled between the motor and the pump, wherein the motor is configured to rotate the shaft and thereby drive the pump, and
a step-down transformer subsystem coupled to the motor, wherein the transformer subsystem is configured to receive power from a power cable at a first voltage, to transform the power to a second voltage which is less than the first voltage, and to provide the power at the second voltage to the motor, wherein the transformer subsystem comprises one or more toroidal transformers, each toroidal transformer having an axial aperture therethrough, and each being positioned with the shaft extending through the axial aperture.

2. The method of claim 1, further comprising a seal, wherein the seal is coupled to the pump, and wherein the transformer subsystem is coupled between the motor and the seal.

3. The method of claim 2, wherein the transformer subsystem is configured to enable oil to flow therethrough between the motor and the seal.

4. The method of claim 1, wherein the power comprises three-phase power, wherein the transformer subsystem comprises three sets of the toroidal transformers, and where each of the three sets of the toroidal transformers is configured to transform a unique one of the phases of the three-phase power.

5. The method of claim 1, wherein each of the toroidal transformers includes a toroidal core formed from a material having a Curie temperature of at least 500° F.

6. The method of claim 1, wherein the step-down transformer comprises a self-contained, modular unit.

7. The method of claim 1, further comprising:
surface equipment configured to produce power at a surface voltage; and
a power cable coupled to the surface equipment and configured to transmit the power produced by the surface equipment to the transformer subsystem.

8. The method of claim 7, wherein the surface equipment includes:
a drive unit configured to produce output power at a preliminary voltage; and
a step-up transformer configured to transform the output power at the preliminary voltage to the surface voltage.

9. A method for retrofitting an electric submersible pump (ESP) system comprising:
providing an ESP system, wherein the ESP system includes a drive subsystem configured to generate output power at a first voltage, and a motor which is coupled to the drive subsystem by a power cable, wherein the motor is configured to receive power from the cable at a second voltage and to operate using the received power at the second voltage;
inserting a step-up transformer between the drive subsystem and the power cable, wherein the step-up transformer transforms the output power to a third voltage which is greater than the first voltage and provides the output power at the third voltage to the power cable;
inserting a step-down transformer between the power cable and the motor, wherein the step-down transformer receives power received from the power cable at a fourth voltage which is greater than the second voltage, transforms the power at the fourth voltage to the second voltage, and provides the power at the second voltage to the motor; and wherein the transformer subsystem comprises one or more toroidal transformers, each toroidal transformer having an axial aperture therethrough, and each being positioned with a shaft of the motor extending through the axial aperture.

10. The method of claim 9, wherein the first and second voltages are less than 8 kV and the third and fourth voltages are greater than 8 kV.

11. The method of claim 9, wherein the third voltage is at least twice the first voltage and the fourth voltage is at least twice the second voltage.

12. The method of claim 9, wherein the step-down transformer comprises a self-contained, modular unit that is coupled to the motor without modification of the motor.

* * * * *